United States Patent [19]
Kang

[11] Patent Number: 5,329,316
[45] Date of Patent: Jul. 12, 1994

[54] CONTOUR COMPENSATOR FOR VIDEO IMAGE HAVING OVERLAPPING INFORMATION

[75] Inventor: Koo-ho Kang, Suwon, Rep. of Korea

[73] Assignee: Samsung Electronics Co., Ltd., Kyunggi-Do, Rep. of Korea

[21] Appl. No.: 875,439

[22] Filed: Apr. 29, 1992

[30] Foreign Application Priority Data

Dec. 27, 1991 [KR] Rep. of Korea ............. 91-24671

[51] Int. Cl.⁵ .................................... H04N 5/208
[52] U.S. Cl. ................................ 348/625; 348/588
[58] Field of Search ............... 358/183, 166, 162, 37, 358/167, 96, 142, 147; H04N 5/208

[56] References Cited

U.S. PATENT DOCUMENTS 5,225,910  7/1993  Sugimori et al. .............. 358/166
5,237,625  8/1993  Yamashita et al. ............. 358/166

FOREIGN PATENT DOCUMENTS 0505999  9/1992  European Pat. Off. ..... H04N 5/208
3241976 10/1991  Japan ......................... H04N 5/208

Primary Examiner—James J. Groody
Assistant Examiner—Jeffrey S. Murrell

[57] ABSTRACT

A contour compensator for adding preshoot or overshoot to a transitional portion of a video signal to improve the resolution of a picture. The compensator comprises a window signal generator for generating a window signal corresponding to a portion of the video signal where additional information, such as characters, overlaps the picture. This window signal interrupts the preshoot or overshoot to be added to the transitional portion of the video signal at the point where additional information overlaps the picture. The compensator controls the amount of preshoot or overshoot in a portion of the video signal in which additional information, e.g. a news flash, a weather bulletin, or a movie subtitle overlaps a picture, thereby obtaining a video signal which is contour-compensated without being affected by the additional information.

8 Claims, 2 Drawing Sheets

CONTOUR COMPENSATOR FOR VIDEO IMAGE HAVING OVERLAPPING INFORMATION

BACKGROUND OF THE INVENTION

The present invention relates to a contour compensator for adding preshoot or overshoot to a video signal that includes luminance and chromaticity components. The preshoot or overshoot is added while the video signal is in transition between two levels. More particularly, the invention relates to a circuit for interrupting or controlling the amount of preshoot or overshoot to be added to a transitional portion of the video signal in which supplemental information (such as a news flash, weather bulletin, or a movie subtitle) overlaps the picture.

Resolution of a picture, that corresponds to a video signal reproduced by a tuner of a television receiver or reproduced by a magnetic record/playback apparatus, is enhanced by adding preshoot or overshoot to the video signal when its amplitude is in transition. This addition is called contour compensation and relates to the slope of the video signal's amplitude. For instance, preshoot or overshoot is added to the transitional portion of a luminance signal, such as when the signal changes from a black to a white level to emphasize the contrast between white and black and enhance the picture resolution.

However, depending on the picture's content, such contour compensation may deteriorate picture quality by adding a constant amount of contour compensation to the amplitude of a video signal, that is in transition, regardless of the content of the picture. More specifically, a constant amount of compensation may be added, regardless of the amount of correlation between scan lines of a video signal or the magnitude of a particular frequency component of the video signal. Thus, the amount of contour compensation will be excessive for a picture showing swift movement or including many details and the resulting picture will be rough. Specifically, as the intricacy of a picture increases the magnitude of the high-frequency component also increases. Adding a large amount of preshoot or overshoot to the video signal for this detailed picture causes the picture to deteriorate since the preshoot or overshoot dominates the video signal.

To solve this problem, an improved contour compensator has been proposed which compensates for contour based on the amount of correlation between video scan lines and the magnitude of the high frequency component of the video signal in order to control the amount of contour compensation. For instance, the improved contour compensator increases the amount of contour compensation for a portion of a video signal that has a high degree of correlation, such as in a video portion having slight movement. The contour compensation is also increased in a video portion having a small high-frequency component, such as in a coarse picture having few details. Similarly, the improved contour compensation reduces the amount of compensation for portions of the video signal having a small degree of correlation between scanning lines or for video signal portions having a large high-frequency component, thereby performing proper contour compensation according to the contents of the picture.

Meanwhile, in the video signal, there are times when character information overlaps the periphery of a picture. For instance, when a news flash or weather bulletin overlaps the video signal transmitted from a television station. This additional independent information is usually presented at the bottom of the picture. Further, captions from movies, such as subtitles may overlap the video signal recorded on a magnetic recording apparatus. Video signals having this overlapping information are different from the original signals, and thus experience radical level transitions. If the contour compensation signal is added based upon these radical transitions, which represent an incorrect video signal, the picture becomes unnatural. This unnatural characteristic results from the fact that a video signal containing overlapping information has a different S/N ratio than a video signal without overlapping information. Thus, when a video signal has overlapped information on the picture's periphery, the contour compensation signal or the amount of contour compensation added to the periphery of the picture must be interrupted or controlled.

SUMMARY OF THE INVENTION

It is an object of the present invention to provide a contour compensator for improving the resolution of a picture corresponding to a video signal, in which the compensator interrupts or controls the amount of preshoot or overshoot in a portion of the video signal where additional information such as a news flash, a weather bulletin or a movie subtitle overlaps the picture.

To accomplish the object, a contour compensator for adding preshoot or overshoot to a transitional portion of a video signal so as to improve the resolution of a picture, comprises a window signal generator for generating a window signal corresponding to the portion of the video where additional information, such as characters, overlaps a picture. This window signal interrupts the preshoot or overshoot to be added to the transitional portion of the video signal where the additional character information overlaps the picture.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
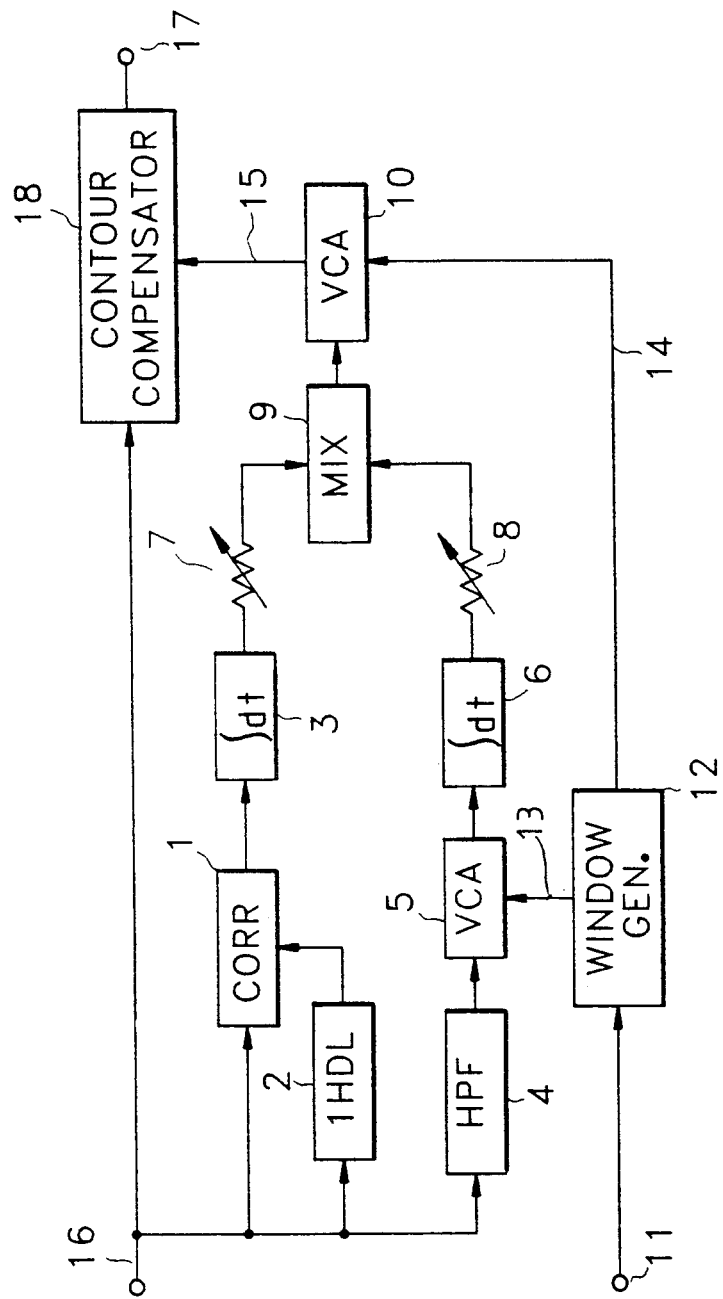
FIG. 1 illustrates one embodiment of a contour compensator of the present invention.

Referring to FIG. 1, an input port 16 receives a video signal having luminance and chromaticity signals. An output port 17 outputs a contour-compensated video signal. A contour compensator 18 generates a contour compensation signal to be added to the video signal input via input port 16. The compensator includes a control port, which receives a control signal 15, for controlling the amount of contour compensation. A correlation detector 1 and a one horizontal period delay line (1HDL) 2 detect the amount of correlation between horizontal scan lines. A high-pass filter (HPF) 4 detects a high frequency component of a video signal. Integrators 3 and 6 integrate the outputs of correlation detector 1 and HPF 4 to form DC components. Variable resistors 7 and 8 and a mixer 9 mix the amount of correlation between horizontal scan lines and the magnitude of the high frequency component at a constant rate. A sync signal input 11 receives a composite sync signal. A window signal generator 12 generates horizontal and vertical window signals corresponding to at least part of a picture. Voltage controlled amplifiers (VCA) 5 and 10 receive the horizontal and vertical window signals, respectively, and adjust their gains based on the corresponding window signal.

Operation of the embodiment of the contour compensator shown in FIG. 1 is described hereafter.

A video signal including luminance and chromaticity components is fed to contour compensator 18 via input port 16. The video signal to which a contour compensation signal is added by contour compensator 18 is output via output port 17. The video signal fed to input port 16 is also input to the 1HDL 2 and correlation detector 1 to obtain the amount of correlation between horizontal scan lines. This correlation amount is integrated by integrator 3 to form a DC component. Thereafter, the DC component is adjusted to a proper level by variable resistor 7 and is supplied to a first input of mixer 9.

The video signal fed to input port 16 is also input to HPF 4 which detects the high frequency component contained in the video signal. The output of the HPF 4 is amplified by VCA 5 and integrated by integrator 6 to form a DC component. Thereafter, the DC component is adjusted to a proper level by variable resistor 8 and supplied to a second input of the mixer 9, the output of which is fed to VCA 10. Window signal generator 12 generates a horizontal window signal 13 and a vertical window signal 14, based on the sync signal input, via sync signal input port 11. Horizontal window signal 13 is supplied to the control port of VCA 5 to control the output level of the HPF 4. Vertical window signal 14 is supplied to the control port of VCA 10 to control the output level of the mixer 9. The output of VCA 10 is input to the control port of contour compensator 18 as a control signal 15.

The horizontal and vertical window signals 13 and 14 are generated during predetermined portions of the video signal which corresponds to a designated region in the picture. The window generator 12 uses the sync signal on input port 11 to determine video signal portions during which the VCA 5 and VCA 10 outputs should be reduced or shut-off. When these predetermined portions of the video signal occur, the horizontal window signal is output and the VCA 5 output is reduced or shut-off. Similarly, the window generator 12 issues a vertical window signal during predetermined portions of the picture to reduce or shut-off the VCA 10 output. Thus, when additional character/independent information appears in the lower portion of the picture, then the horizontal and vertical window signals 13 and 14 adjust the outputs of VCA 5 and 10 according during the portion of the video signal corresponding to the lower section of the picture. Accordingly, a contour compensation signal is not added (or is reduced before being added) to the video signal.

Alternatively, the horizontal and vertical window signals 13 and 14 may be controlled to interrupt the VCA 5 and 10 during a different portion of the picture (e.g. the upper left or right corners), not just the lower portion. For instance, if character information were to appear in the upper 30% and only along the left side of the picture, then the horizontal window signal would suppress/reduce the output of VCA 5 during the first half of each horizontal video scan line during the upper 30% of the picture. Similarly, the vertical window signal would suppress/reduce the output of VCA 10 during the upper 30% of the picture.

Once the appropriate contour compensation level is set according to which portion of the picture the video signal represents, the video signal is added with the contour compensation signal, and the sum is output via output port 17. As a result, a video signal is obtained which is contour-compensated without being affected by additional information (character or independent information) overlapping the periphery of a picture.

Figure 2:
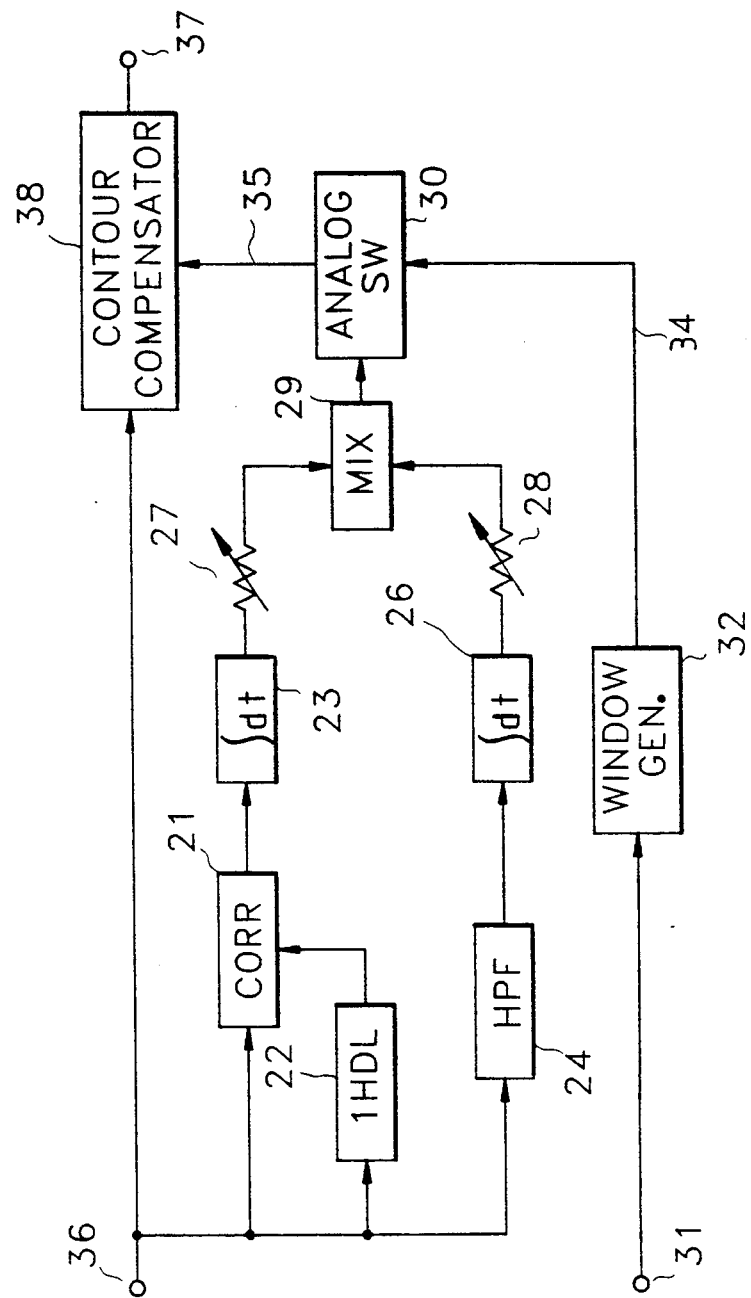
FIG. 2 illustrates another embodiment of a contour compensator of the present invention.

FIG. 2 illustrates another embodiment of this invention, in which an input port 36 receives a video signal having luminance and chromaticity components. An output port 37 outputs a contour-compensated video signal. A contour compensator 38 generates a contour compensation signal which is added to the video signal input via input port 36. The compensator 38 includes a control port for controlling the amount of contour compensation. A correlation detector 21 and the 1 HDL 22 detect the amount of correlation between horizontal scan lines. A HPF 24 detects a high frequency component of a video signal. Integrators 23 and 26 integrate the outputs of correlation detector 21 and HFP 24 to form respective DC components. Variable resistors 27 and 28 and a mixer 29 mix the amount of correlation between horizontal scan lines and the amount of the high frequency component at a constant rate. A sync signal input 31 receives a composite sync signal. A window signal generator 32 generates a window signal corresponding to at least part of a picture. Reference numeral 30 represents an analog switch.

Operation of the embodiment of FIG. 2 is described hereafter.

A video signal including luminance and chromaticity components is fed to contour compensator 38 via input port 36. The video signal, to which a contour compensation signal is added by contour compensator 38, is output via output port 37. Meanwhile, the video signal fed to input port 36 is also input to 1HDL 22 and correlation detector 21 to obtain the amount of correlation between horizontal scan lines and integrated by integrator 23 to form a DC component. Thereafter, the video signal is adjusted to a proper level by variable resistor 27 and is supplied to a first input of mixer 29.

The video signal fed to input port 36 is also input to HPF 24 which detects the high frequency component contained in the video signal, and is integrated by integrator 26 to form a DC component. Thereafter, the video signal is adjusted to a proper level by variable resistor 28 and is supplied to a second input of mixer 29. The output of mixer 29 is fed to analog switch 30. Window signal generator 32 generates a vertical window signal 34 from the sync signal input via sync signal input port 31. Vertical window signal 34 represents a signal that sends a pulse to the analog switch 32. The pulse begins at about 4.5 ms before the vertical blanking period and lasts until the start of the vertical blanking period. The output of mixer 29 is switched at the analog switch 30 by each pulse in the vertical window signal 34 such that a control signal 35, which is supplied to the control port of contour compensator 38, is interrupted from about 4.5 ms before a vertical blanking period until the start of the vertical blanking period. Thus the control signal 35 operates to ensure that a contour compensation signal is not added to approximately the lower 30% of each picture that is obtained via output port 37. As a result, a video signal is obtained which is contour-compensated, but is not affected by only additional character or independent information which overlaps the lower part of a picture.

As described above in detail, the contour compensator of the present invention is able to add an optimal contour compensation signal to a video signal without being affected by additional information such as character information or other independent information overlapping the periphery of a picture.

While the invention has been particularly shown and described with reference to preferred embodiment thereof, it will be understood by those skilled in the art that various changes in form and details may be made therein without departing from the spirit and scope of the invention as defined by the appended claims.

What is claimed is:

1. A contour compensator comprising:
   a compensator for adding preshoot or overshoot to a transitional portion of a video signal to improve the resolution of a picture, said video signal including picture and additional information,
   a window signal generator, connected to said compensator, for receiving said video signal and for generating a window signal during a portion of said video signal that contains said additional information which overlaps the picture, said window signal interrupting said compensator and preventing addition of said preshoot or overshoot to the transitional portion of the video signal in which said additional information overlaps the picture.

2. A contour compensator as claimed in claim 1, wherein said window signal generator receives a synchronizing signal contained in said video signal and generates a window signal based upon said synchronizing signal, said window signal corresponding to the bottom 30 percent of said picture, such that no preshoot or overshoot is added to the bottom 30 percent of the picture.

3. A contour compensator as claimed in claim 1 further comprising:
   a contour compensation control signal generator for generating a contour compensation control signal based on an amount of correlation between scan lines of a video signal and a magnitude of a high frequency component of the video signal, said contour compensation control signal controlling the amount of preshoot or overshoot added in said contour compensator to the video signal; and
   an interrupter, connected between said contour compensation control signal generator and the compensator, for interrupting the contour compensation control signal based on the window signal.

4. A contour compensator as claimed in claim 3, wherein said interrupter comprises an analog switch.

5. A contour compensator comprising:
   compensator means for adding preshoot or overshoot to a transitional portion of a video signal to improve the resolution of a picture,
   window signal generator means for generating a window signal corresponding to a portion of the picture in which additional information overlaps the picture, said window signal controlling the amount of preshoot or overshoot added to the transitional portion of the video signal in which the additional information overlaps the picture.

6. A contour compensator as claimed in claim 5, wherein said window signal generator means receives a synchronizing signal contained in the video signal and generates therefrom a window signal corresponding to the bottom 30 percent of the picture.

7. A contour compensator as claimed in claim 5 further comprising:
   contour compensation control signal generator means for generating a contour compensation control signal corresponding to an amount of correlation between scan lines of the video signal and to an amplitude of a high frequency component of the video signal, said contour compensation control signal controlling the amount of preshoot or overshoot to be added in said contour compensator to the video signal; and
   controller means for controlling a size of the contour compensation control signal based on the window signal.

8. A contour compensator as claimed in claim 5, wherein said controller comprises a voltage controlled amplifier.

* * * * *